(12) United States Patent
Abe et al.

(10) Patent No.: US 11,198,778 B2
(45) Date of Patent: Dec. 14, 2021

(54) NONAQUEOUS ELECTROLYTE SECONDARY BATTERY SEPARATOR

(71) Applicant: Sumitomo Chemical Company, Limited, Tokyo (JP)

(72) Inventors: Tsuneyuki Abe, Niihama (JP); Takamasa Egawa, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 448 days.

(21) Appl. No.: 16/163,644

(22) Filed: Oct. 18, 2018

(65) Prior Publication Data
US 2019/0119476 A1 Apr. 25, 2019

(30) Foreign Application Priority Data

Oct. 20, 2017 (JP) .............................. JP2017-203454

(51) Int. Cl.
| | | |
|---|---|---|
| *C08L 23/06* | (2006.01) | |
| *C08J 9/26* | (2006.01) | |
| *H01M 10/0525* | (2010.01) | |
| *C08J 9/36* | (2006.01) | |
| *B32B 5/18* | (2006.01) | |
| *H01M 50/409* | (2021.01) | |
| *H01M 50/411* | (2021.01) | |
| *H01M 50/449* | (2021.01) | |

(52) U.S. Cl.
CPC ............... *C08L 23/06* (2013.01); *B32B 5/18* (2013.01); *C08J 9/26* (2013.01); *C08J 9/36* (2013.01); *H01M 10/0525* (2013.01); *H01M 50/409* (2021.01); *H01M 50/411* (2021.01); *H01M 50/449* (2021.01); *C08J 2201/044* (2013.01); *C08J 2323/06* (2013.01); *C08J 2323/12* (2013.01); *C08J 2491/06* (2013.01)

(58) Field of Classification Search
CPC ....................................................... C08L 23/06
See application file for complete search history.

(56) References Cited

U.S. PATENT DOCUMENTS

2018/0233709 A1* 8/2018 Muraki ................ H01M 50/116

FOREIGN PATENT DOCUMENTS

| JP | 2002-088188 A | 3/2002 |
|---|---|---|
| JP | 2014011041 A | 1/2014 |
| WO | 2017065223 | 4/2017 |

* cited by examiner

*Primary Examiner* — Larry W Thrower
(74) *Attorney, Agent, or Firm* — Panitch Schwarze Belisario & Nadel LLP

(57) ABSTRACT

As a nonaqueous electrolyte secondary battery separator having a transverse direction/machine direction crease recovery angle ratio of close to 1, a nonaqueous electrolyte secondary battery separator is provided that includes a polyolefin porous film having a ratio of a 60-degree gloss in an machine direction to a 60-degree gloss in a transverse direction which ratio is not less than 1.00.

8 Claims, No Drawings

NONAQUEOUS ELECTROLYTE SECONDARY BATTERY SEPARATOR

This Nonprovisional application claims priority under U.S.C. § 119 on Patent Application No. 2017-203454 filed in Japan on Oct. 20, 2017, the entire contents of which are hereby incorporated by reference.

TECHNICAL FIELD

The present invention relates to a separator for a nonaqueous electrolyte secondary battery (hereinafter referred to as a "nonaqueous electrolyte secondary battery separator").

BACKGROUND ART

Nonaqueous electrolyte secondary batteries such as a lithium secondary battery are currently in wide use as (i) batteries for devices such as a personal computer, a mobile telephone, and a portable information terminal or (ii) on-vehicle batteries.

As an example of such a nonaqueous electrolyte secondary battery separator, Patent Literature 1 discloses, as a porous base material useful for providing a nonaqueous electrolyte secondary battery separator excellent in ion permeability and mechanical strength, a polyethylene microporous film whose average pore diameter of void, porosity, puncture strength, and others are arranged to be in specific ranges.

CITATION LIST

Patent Literature

[Patent Literature 1]
Japanese Patent Application Publication, Tokukai, No. 2002-88188

SUMMARY OF INVENTION

Technical Problem

A nonaqueous electrolyte secondary battery separator may become at least partially folded in response to stress caused while, for instance, the nonaqueous electrolyte secondary battery separator is being wound off or wound up for storage, transport, or production.

Conventional nonaqueous electrolyte secondary battery separators become easily deformed, for example, creased or bent during, for example, storage, transport, and production as a result of a large difference between the degree of recovery from a fold in the MD and the degree of recovery from a fold in the TD. Thus, conventional nonaqueous electrolyte secondary battery separators, for example, cannot be handled sufficiently easily.

An aspect of the present invention has been attained in view of the above issue. It is an object of the aspect of the present invention to provide a nonaqueous electrolyte secondary battery separator having a small anisotropy in terms of the crease recovery angle.

Solution to Problem

The present invention encompasses the following aspects [1] to [6]:

[1] A nonaqueous electrolyte secondary battery separator including: a polyolefin porous film, the polyolefin porous film having a ratio of a 60-degree gloss in an MD to a 60-degree gloss in a TD which ratio is not less than 1.00.

[2] The nonaqueous electrolyte secondary battery separator according to [1], further including: an insulating porous layer.

[3] The nonaqueous electrolyte secondary battery separator according to [2], wherein the insulating porous layer contains at least one resin selected from the group consisting of a polyolefin, a (meth)acrylate-based resin, a fluorine-containing resin, a polyamide-based resin, a polyester-based resin, and a water-soluble polymer.

[4] The nonaqueous electrolyte secondary battery separator according to [3], wherein the polyamide-based resin is aramid resin.

[5] A nonaqueous electrolyte secondary battery member including: a positive electrode; a nonaqueous electrolyte secondary battery separator according to any one of [1] to [4]; and a negative electrode, the positive electrode, the nonaqueous electrolyte secondary battery separator, and the negative electrode being disposed in this order.

[6] A nonaqueous electrolyte secondary battery including: a nonaqueous electrolyte secondary battery separator according to any one of [1] to [4].

Advantageous Effects of Invention

An embodiment of the present invention advantageously provides a nonaqueous electrolyte secondary battery separator having a TD/MD crease recovery angle ratio of close to 1.

DESCRIPTION OF EMBODIMENTS

The following description will discuss an embodiment of the present invention. Note, however, that the present invention is not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

Embodiment 1: Nonaqueous Electrolyte Secondary Battery Separator

A nonaqueous electrolyte secondary battery separator in accordance with Embodiment 1 of the present invention includes a polyolefin porous film, the polyolefin porous film having a ratio of a 60-degree gloss in an MD to a 60-degree gloss in a TD which ratio is not less than 1.00.

For an embodiment of the present invention, the MD/TD ratio of a polyolefin porous film in terms of 60-degree gloss (hereinafter also referred to simply as "MD/TD gloss ratio") is a parameter of a polyolefin porous film in accordance with an embodiment of the present invention which parameter indicates an anisotropy in terms of 60-degree gloss.

The term "60-degree gloss" refers to a gloss for a case where the incident angle and the light-receiving angle are each 60 degrees. Specifically, the 60-degree gloss conforms to JIS Z8741, and is obtained by (i) measuring the intensity of reflected light having a light-receiving angle of 60 degrees for a case where light has been emitted to a portion of a surface of a polyolefin porous film at an incident angle of 60 degrees and (ii) calculating the ratio of the intensity of the reflected light to the intensity of the incident light.

For an embodiment of the present invention, the term "MD gloss" refers to a gloss for a case where during the gloss measurement, the direction of light incident on a polyolefin porous film and the direction of reflected light resulting from the incident light being reflected by the polyolefin porous film are both parallel to the MD (machine direction) of the polyolefin porous film, and the term "TD gloss" refers to a gloss for a case where during the gloss measurement, the direction of the above incident light and the direction of the above reflected light are both parallel to the TD (transverse direction) of the polyolefin porous film. The MD of a polyolefin porous film refers to a machine direction during the production of the polyolefin porous film (that is, the longitudinal direction of the polyolefin porous film), whereas the TD of a polyolefin porous film refers to the direction orthogonal to the machine direction.

For an embodiment of the present invention, the "MD/TD gloss ratio" refers to the ratio of the MD gloss to the TD gloss (that is, MD gloss/TD gloss).

Conventional polyolefin porous films have an MD/TD gloss ratio of less than 1.00 and become, for example, creased easily. The inventors of the present invention discovered the following: The polyolefin porous film in accordance with an embodiment of the present invention has an MD gloss equal to or larger than the TD gloss, that is, an MD/TD gloss ratio of not less than 1.00. This allows the TD/MD crease recovery angle ratio (described later) to be close to 1 and reduces occurrence of, for example, a crease.

The gloss of a polyolefin porous film is influenced by the state of the surface of the polyolefin porous film and the state of the inside of the polyolefin porous film. A polyolefin porous film in accordance with an embodiment of the present invention may undergo, for example, a physical treatment described later for an influence on the surface state and internal state of the polyolefin porous film in such a manner that the respective values of the MD gloss and the TD gloss are adjusted. This allows the MD/TD gloss ratio to be controlled so that the MD/TD gloss ratio is not less than 1.00.

A polyolefin porous film in accordance with an embodiment of the present invention, which has an MD/TD gloss ratio of not less than 1.00, has a reduced difference between the degree of recovery from, for example, a crease and/or a fold in the MD and the degree of recovery from, for example, a crease and/or a fold in the TD. This allows a nonaqueous electrolyte secondary battery separator in accordance with an embodiment of the present invention to have a degree of recovery from, for example, a crease and/or a fold in the MD which degree is equivalent to the degree of recovery from, for example, a crease and/or a fold in the TD, thereby allowing the TD/MD crease recovery angle ratio described later to be close to 1. Reducing the anisotropy in terms of the degree of recovery from, for example, a crease as described above allows the nonaqueous electrolyte secondary battery separator, which is a thin and difficult to handle, to be handled easily during, for example, storage, transport, and production.

A polyolefin porous film in accordance with an embodiment of the present invention has an MD/TD gloss ratio of not less than 1.00.

A polyolefin porous film in accordance with an embodiment of the present invention may have an MD/TD gloss ratio of not more than 2.00 or not more than 1.85.

For an embodiment of the present invention, light is emitted in the MD or TD normally to a plurality of portions of the surface of a polyolefin porous film to determine the intensity of light reflected in the MD or TD at each of the plurality of portions. On the basis of the intensity of the reflected light, the gloss (that is, the MD gloss or TD gloss) at each of the plurality of portions is measured. Then, the average of the respective glosses at the plurality of portions is calculated as the gloss of the polyolefin porous film.

For a uniform gloss of the polyolefin porous film, (i) the respective MD glosses measured at the plurality of portions have a standard deviation of preferably not more than 8.0, more preferably not more than 5.0, even more preferably not more than 4.0, and (ii) the respective TD glosses measured at the plurality of portions have a standard deviation of preferably not more than 8.0, more preferably not more than 5.0, even more preferably not more than 4.0.

The polyolefin porous film in accordance with an embodiment of the present invention has an MD/TD gloss ratio of not less than 1.00 on at least one surface, preferably on both surfaces.

The polyolefin porous film in accordance with an embodiment of the present invention preferably has an MD gloss standard deviation of not more than 8.0 and a TD gloss standard deviation of not more than 8.0 on at least one surface, more preferably on both surfaces.

An embodiment of the present invention uses a crease recovery angle to indicate the degree of recovery of a polyolefin porous film from, for example, a crease and/or a fold. The crease recovery angle is measured at 23° C. and 50% RH by the 4.9 N load method, which is defined in JIS L 1059-1 (2009).

The anisotropy of the degree of recovery from, for example, a crease and/or a fold is expressed as the ratio of the TD crease recovery angle to the MD crease recovery angle (that is, TD crease recovery angle/MD crease recovery angle). The term "TD crease recovery angle" refers to a recovery angle measured of a test piece having a length of 40 mm which length corresponds to the TD of the polyolefin porous film. The term "MD crease recovery angle" refers to a recovery angle measured of a test piece having a length of 40 mm which length corresponds to the MD of the polyolefin porous film. The present specification also uses the term "TD/MD crease recovery angle ratio" to refer to the value of {TD crease recovery angle/MD crease recovery angle}.

A polyolefin porous film in accordance with an embodiment of the present invention has a TD/MD crease recovery angle ratio of preferably not less than 0.5, more preferably not more than 2.0, even more preferably not more than 1.5. A TD/MD crease recovery angle ratio within the above range is preferable as it allows a nonaqueous electrolyte secondary battery separator in accordance with an embodiment of the present invention to be handled more easily during, for example, storage, transport, and production. The TD/MD crease recovery angle ratio is preferably close to 1 in order for the polyolefin porous film to be handled more easily.

A nonaqueous electrolyte secondary battery separator in accordance with Embodiment 1 of the present invention typically includes a polyolefin porous film, and is preferably made of a polyolefin porous film. Further, the nonaqueous electrolyte secondary battery separator in accordance with Embodiment 1 of the present invention may be a nonaqueous electrolyte secondary battery separator which is a laminated body including the polyolefin porous film and an insulating porous layer (described later) (hereinafter also referred to as "laminated separator for a nonaqueous electrolyte secondary battery" or "nonaqueous electrolyte secondary battery laminated separator"). Still further, the nonaqueous electrolyte secondary battery separator in accordance with Embodiment 1 of the present invention may contain, in addition to the insulating porous layer, other porous layer as needed. The other porous layers include publicly known porous layers such as a heat-resistant layer, an adhesive layer, and a protective layer (described later).

The term "polyolefin porous film" refers to a porous film containing a polyolefin-based resin as a main component. The phrase "containing a polyolefin-based resin as a main component" means that the porous film contains a polyolefin-based resin at a proportion of not less than 50% by volume, preferably not less than 90% by volume, more preferably not less than 95% by volume, relative to all the materials of the porous film. The polyolefin porous film may be a base material of a nonaqueous electrolyte secondary battery separator in accordance with an embodiment of the present invention.

The polyolefin porous film has therein many pores, connected to one another, so that a gas and/or a liquid can pass through the polyolefin porous film from one side to the other side.

The polyolefin-based resin more preferably contains a high molecular weight component having a weight-average molecular weight of $3 \times 10^5$ to $15 \times 10^6$. In particular, the polyolefin-based resin more preferably contains a high molecular weight component having a weight-average molecular weight of not less than 1,000,000 because such a polyolefin-based resin allows the polyolefin porous film to have a higher strength.

Examples of the polyolefin-based resin which the polyolefin porous film contains as a main component include, but are not particularly limited to, homopolymers (for example, polyethylene, polypropylene, and polybutene) and copolymers (for example, ethylene-propylene copolymer) both of which are thermoplastic resins and are each produced through polymerization of a monomer(s) such as ethylene, propylene, 1-butene, 4-methyl-1-pentene, and 1-hexene. The polyolefin porous film may include a layer containing only one of these polyolefin-based resins or a layer containing two or more of these polyolefin-based resins.

Among the above examples, polyethylene is preferable as it is capable of preventing (shutting down) a flow of an excessively large electric current at a lower temperature. In particular, a high molecular weight polyethylene containing ethylene as a main component is more preferable. Note that the polyolefin porous film may contain a component(s) other than polyolefin as long as such a component does not impair the function of the layer.

Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is preferable. It is more preferable that the polyethylene contain a high molecular weight component having a weight-average molecular weight of $5 \times 10^5$ to $15 \times 10^6$.

The film thickness of the polyolefin porous film is not particularly limited, but is preferably 4 μm to 40 μm, and more preferably 5 μm to 20 μm.

The film thickness of the polyolefin porous film is preferably not less than 4 μm since an internal short circuit of a battery can be sufficiently prevented with such a film thickness.

On the other hand, the film thickness of the polyolefin porous film is preferably not more than 40 μm since an increase in size of a nonaqueous electrolyte secondary battery can be prevented with such a thickness.

For conventional nonaqueous electrolyte secondary battery separators, a polyolefin porous film having a thickness of not more than 20 μm is more easily creased and/or bent. Such a nonaqueous electrolyte secondary battery separator cannot, for example, be handled easily.

On the other hand, a nonaqueous electrolyte secondary battery separator in accordance with an embodiment of the present invention has a reduced anisotropy in terms of the degree of recovery from, for example, a crease. Thus, even in a case where the polyolefin porous film has a thickness of not more than 20 μm, the nonaqueous electrolyte secondary battery separator is not, for example, creased and/or bent easily. The nonaqueous electrolyte secondary battery separator in accordance with an embodiment of the present invention thus tends to have remarkably improved handleability as compared to conventional nonaqueous electrolyte secondary battery separators.

The polyolefin porous film typically has a weight per unit area of preferably 4 $g/m^2$ to 20 $g/m^2$, and more preferably 5 $g/m^2$ to 12 $g/m^2$, so as to allow a nonaqueous electrolyte secondary battery to have a higher weight energy density and a higher volume energy density.

The polyolefin porous film has an air permeability of preferably 30 sec/100 mL to 500 sec/100 mL, and more preferably 50 sec/100 mL to 300 sec/100 mL, in terms of Gurley values, since a sufficient ion permeability is exhibited with such an air permeability.

The polyolefin porous film has a porosity of preferably 20% by volume to 80% by volume, and more preferably 30% by volume to 75% by volume, so as to (i) retain a larger amount of electrolyte and (ii) obtain the function of reliably preventing (shutting down) a flow of an excessively large electric current at a lower temperature.

[Method of Producing Polyolefin Porous Film]

A polyolefin porous film in accordance with an embodiment of the present invention may be produced by any method such as a publicly known dry method or wet method. An example method includes (i) shaping a polyolefin-based resin into a sheet, (ii) stretching the resulting sheet, and (iii) subjecting the stretched film to a physical treatment. An example method includes (i) adding a pore forming agent such as calcium carbonate or a plasticizing agent to a polyolefin-based resin, (ii) shaping the resulting product into a sheet, (iii) removing the pore forming agent from the product with use of an appropriate solvent, (iv) stretching the resulting sheet, and (v) subjecting the stretched film to a physical treatment.

The physical treatment is, for example, one or more methods selected from (i) a method of rubbing the stretched film in the MD with use of, for example, sandpaper or paper wipe, (ii) a method of directly passing the stretched film through rollers each having a patterned shape such as asperities, and (iii) a method of rubbing the stretched film by creating a difference between the film transfer speed and a roller rotation speed when passing the stretched film through rollers.

The description below deals with the production method in greater detail. In a case where, for instance, a polyolefin porous film is to contain a polyolefin resin containing polyethylene or polypropylene, the polyolefin porous film is preferably produced by a method such as a method including the following steps:

(1) kneading (i) polyethylene, polypropylene, or a mixture of polyethylene and polypropylene and (ii) a pore forming agent to prepare a polyolefin resin composition;

(2) shaping the polyolefin resin composition prepared in the step (1) into a sheet;

(3) removing the pore forming agent from the sheet prepared in the step (2);

(4) stretching the sheet prepared in the step (3) into a stretched film; and (5) subjecting the stretched film prepared in the step (4) to the physical treatment so that a polyolefin porous film is obtained.

The step (3) may alternatively be carried out after the step (4). Specifically, the method may alternatively include (i) instead of the step (3) above, (3a) stretching the sheet prepared in the step (2) into a stretched film and (ii) instead of the step (4), (4a) removing the pore forming agent from the stretched film prepared in the step (3a).

Further, in a case where, for instance, a polyolefin porous film is to contain (i) ultra-high molecular weight polyethylene and (ii) a polyolefin resin containing a low molecular weight polyolefin having a weight-average molecular weight of not more than 10,000, a polyolefin porous film is preferably produced by a method such as a method including the following steps:

(1') kneading 100 parts by weight of ultra-high molecular weight polyethylene, 5 parts by weight to 200 parts by weight of low molecular weight polyolefin having a weight-average molecular weight of equal to or less than 10,000, and 100 parts by weight to 400 parts by weight of a pore forming agent such as calcium carbonate so that a polyolefin resin composition is obtained;

(2') shaping the polyolefin resin composition obtained in the step (1') into a sheet;

(3') removing the pore forming agent from the sheet prepared in the step (2');

(4') stretching the sheet prepared in the step (3') into a stretched film; and (5') subjecting the stretched film prepared in the step (4') to the physical treatment so that a polyolefin porous film is obtained.

A polyolefin porous film in accordance with an embodiment of the present invention may be a polyolefin porous film produced by a method identical to the above method except that the physical treatment in the step (5) or the step (5') is not carried out and that instead, production conditions such as a condition for shaping the sheet in the step (2) or the step (2') and/or a condition for stretching the sheet in the step (4), the step (3a), or the step (4') are adjusted so that the surface state has been controlled such that the MD/TD gloss ratio is not less than 1.00.

[Insulating Porous Layer]

In a case where the nonaqueous electrolyte secondary battery separator in accordance with Embodiment 1 of the present invention is a nonaqueous electrolyte secondary battery laminated separator, the nonaqueous electrolyte secondary battery laminated separator preferably includes the polyolefin porous film and an insulating porous layer disposed on the polyolefin porous film.

The insulating porous layer (hereinafter, also referred to simply as "porous layer") is normally a resin layer containing a resin and is preferably a heat-resistant layer or an adhesion layer. The insulating porous layer preferably contains a resin that is insoluble in an electrolyte of a battery and that is electrochemically stable when the battery is in normal use.

The porous layer is provided on one surface or both surfaces of the polyolefin porous film as needed. In a case where the porous layer is provided on one surface of the polyolefin porous film, the porous layer is preferably provided on that surface of the polyolefin porous film which surface faces a positive electrode of a nonaqueous electrolyte secondary battery to be produced, more preferably on that surface of the polyolefin porous film which surface comes into contact with the positive electrode.

Examples of the resin of which the porous layer is made encompass: polyolefins; (meth)acrylate-based resins; fluorine-containing resins; polyamide-based resins; polyimide-based resins; polyester-based resins; rubbers; resins with a melting point or glass transition temperature of not lower than 180° C.; water-soluble polymers; polycarbonate, polyacetal and polyether ether ketone.

Among the above resins, polyolefins, (meth)acrylate-based resins, fluorine-containing resins, polyamide-based resins, polyester-based resins and water-soluble polymers are preferable.

Preferable examples of the polyolefins encompass polyethylene, polypropylene, polybutene, and an ethylene-propylene copolymer.

Examples of the fluorine-containing resins encompass polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoro ethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; a fluorine-containing rubber having a glass transition temperature of equal to or less than 23° C. among the fluorine-containing resins.

As the polyamide-based resins, aramid resins such as aromatic polyamides and wholly aromatic polyamides are preferable.

Specific examples of the aramid resins encompass poly(paraphenylene terephthalamide), poly(methaphenylene isophthalamide), poly(parabenzamide), poly(metabenzamide), poly(4,4'-benzanilide terephthalamide), poly(paraphenylene-4,4'-biphenylene dicarboxylic acid amide), poly(methaphenylene-4,4'-biphenylene dicarboxylic acid amide), poly(paraphenylene-2,6-naphthalene dicarboxylic acid amide), poly(methaphenylene-2,6-naphthalene dicarboxylic acid amide), poly(2-chloroparaphenylene terephthalamide), a paraphenylene terephthalamide/2,6-dichloroparaphenylene terephthalamide copolymer, and a methaphenylene terephthalamide/2,6-dichloroparaphenylene terephthalamide copolymer. Among these aramid resins, poly(paraphenylene terephthalamide) is more preferable.

As the polyester-based resins, aromatic polyesters such as polyarylates and liquid crystal polyesters are preferable.

Examples of the rubbers encompass a styrene-butadiene copolymer and a hydride thereof, a methacrylate ester copolymer, an acrylonitrile-acrylic ester copolymer, a styrene-acrylic ester copolymer, and ethylene propylene rubber, and polyvinyl acetate.

Examples of the resins with a melting point or glass transition temperature of not lower than 180° C. encompass polyphenylene ether, polysulfone, polyether sulfone, polyphenylene sulfide, polyetherimide, polyamide imide, and polyetheramide.

Examples of the water-soluble polymers encompass polyvinyl alcohol, polyethylene glycol, cellulose ether, sodium alginate, polyacrylic acid, polyacrylamide, and polymethacrylic acid.

It is possible to use only one kind of resin for the porous layer or two or more kinds of resins in combination for the porous layer.

The porous layer may contain fine particles. The term "fine particles" herein means organic fine particles or inorganic fine particles generally referred to as a filler. Therefore, in a case where the porous layer contains fine particles, the above resin contained in the porous layer has a function as a binder resin for binding (i) fine particles together and (ii) fine particles and the polyolefin porous film. The fine particles are preferably electrically insulating fine particles.

Examples of the organic fine particles contained in the porous layer encompass resin fine particles.

Specific examples of the inorganic fine particles contained in the porous layer encompass fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. These inorganic fine particles are electrically insulating fine particles. The porous layer may contain only one kind of the fine particles or two or more kinds of the fine particles in combination.

Among the above fine particles, fine particles made of an inorganic matter is suitable. Fine particles made of an inorganic oxide such as silica, calcium oxide, magnesium oxide, titanium oxide, alumina, mica, zeolite, aluminum hydroxide, or boehmite are preferable. Further, fine particles made of at least one kind selected from the group consisting of silica, magnesium oxide, titanium oxide, aluminum hydroxide, boehmite, and alumina are more preferable. Fine particles made of alumina are particularly preferable.

A fine particle content of the porous layer is preferably 1% by volume to 99% by volume, and more preferably 5% by volume to 95% by volume with respect to 100% by volume of the porous layer. In a case where the fine particle content falls within the above range, it is less likely for a void, which is formed when fine particles come into contact with each other, to be blocked by a resin or the like. This makes it possible to achieve sufficient ion permeability and a proper weight per unit area of the porous layer.

The porous layer may include a combination of two or more kinds of fine particles which differ from each other in particle and/or specific surface area.

The porous layer has a thickness (for a single layer) within a range of preferably 0.5 μm to 15 μm, more preferably 1 μm to 10 μm.

If the thickness (for a single layer) of the porous layer is less than 0.5 μm, it may not be possible to sufficiently prevent an internal short circuit resulting from breakage or the like of a battery. In addition, the porous layer may be only capable of retaining a reduced amount of electrolyte. If the thickness (for a single layer) of the porous layer is more than 15 μm, the battery characteristic may be degraded.

The weight per unit area of the porous layer (for a single layer) is preferably 1 g/m$^2$ to 20 g/m$^2$, more preferably 1 g/m$^2$ to 10 g/m$^2$.

The volume per cubic meter of a porous layer constituent component contained in the porous layer (for a single layer) is preferably 0.5 cm$^3$ to 20 cm$^3$, more preferably 1 cm$^3$ to 10 cm$^3$, even more preferably 2 cm$^3$ to 7 cm$^3$.

For the purpose of obtaining sufficient ion permeability, a porosity of the porous layer is preferably 20% by volume to 90% by volume, and more preferably 30% by volume to 80% by volume. In order for a nonaqueous electrolyte secondary battery laminated separator to obtain sufficient ion permeability, a pore diameter of each of pores of the porous layer is preferably not more than 3 μm, and more preferably not more than 1 μm.

[Nonaqueous Electrolyte Secondary Battery Laminated Separator]

The nonaqueous electrolyte secondary battery separator in accordance with Embodiment 1 of the present invention can be a laminated body which is a nonaqueous electrolyte secondary battery laminated separator.

The laminated body has a film thickness of preferably 5.5 μm to 45 μm, more preferably 6 μm to 25 μm, even more preferably 6 μm to 20 μm.

A conventional laminated body having a thickness of not more than 20 μm is more easily creased and/or bent, and cannot, for example, be handled easily. A laminated body in accordance with an embodiment of the present invention has a reduced anisotropy in terms of the degree of recovery from, for example, a crease. Thus, even in a case where the laminated body has a thickness of not more than 20 μm, the laminated body is not, for example, creased and/or bent easily. The laminated body in accordance with an embodiment of the present invention thus tends to have more remarkably improved handleability as compared to conventional laminated bodies.

The laminated body has an air permeability of preferably 30 sec/100 mL to 1000 sec/100 mL, and more preferably 50 sec/100 mL to 800 sec/100 mL, in terms of Gurley values.

[Method of Producing Nonaqueous Electrolyte Secondary Battery Laminated Separator (Laminated Body)]

The nonaqueous electrolyte secondary battery separator (laminated body) in accordance with an embodiment of the present invention can be produced by, for example, applying a coating solution (described later) to a surface of the polyolefin porous film in accordance with an embodiment of the present invention and then drying the coating solution so as to deposit the insulating porous layer.

Prior to applying the coating solution to a surface of the polyolefin porous film in accordance with an embodiment of the present invention, the surface to which the coating solution is to be applied can be subjected to a hydrophilization treatment as needed.

The coating solution for use in a method for producing a nonaqueous electrolyte secondary battery separator (laminated body) in accordance with an embodiment of the present invention can be prepared typically by (i) dissolving, in a solvent, a resin that may be contained in the porous layer described above and (ii) dispersing, in the solvent, fine particles that may be contained in the porous layer described above. Note, here, that the solvent in which the resin is to be dissolved also serves as a dispersion medium in which the fine particles are to be dispersed. The resin may be contained in the coating solution in the form of an emulsion instead of being dissolved in a solvent.

The solvent (dispersion medium) is not limited to any particular one, provided that (i) the solvent does not have an adverse effect on the polyolefin porous film, (ii) the solvent allows the resin to be uniformly and stably dissolved in the solvent, and (iii) the solvent allows the fine particles to be uniformly and stably dispersed in the solvent. Specific examples of the solvent (dispersion medium) encompass water and organic solvents. Only one of these solvents can be used, or two or more of these solvents can be used in combination.

The coating solution may be prepared by any method that allows the coating solution to satisfy conditions such as the resin solid content (resin concentration) and the fine-particle amount that are necessary to produce a desired porous layer. Specific examples of the method of forming the coating solution encompass a mechanical stirring method, an ultrasonic dispersion method, a high-pressure dispersion method, and a media dispersion method.

Further, the coating solution may contain, as a component(s) other than the resin and the fine particles, an additive(s) such as a disperser, a plasticizer, a surfactant, and/or a pH adjustor, provided that the additive does not prevent the object of an embodiment of the present invention from being attained. Note that the additive may be contained in an amount that does not prevent the object of an embodiment of the present invention from being attained.

A method of applying the coating solution to the polyolefin porous film, that is, a method of forming a porous layer on a surface of the polyolefin porous film is not limited to any particular one. The porous layer can be formed by, for example, (i) a method including the steps of applying the coating solution directly to a surface of the polyolefin porous film and then removing the solvent (dispersion medium), (ii) a method including the steps of applying the coating solution to an appropriate support, removing the solvent (dispersion medium) for formation of a porous layer, then pressure-bonding the porous layer to the polyolefin porous film, and subsequently peeling the support off, and (iii) a method including the steps of applying the coating solution to a surface of an appropriate support, then pressure-bonding the polyolefin porous film to that surface, then peeling the support off, and subsequently removing the solvent (dispersion medium).

The coating solution can be applied by a conventionally publicly known method. Specific examples of such a method include a gravure coater method, a dip coater method, a bar coater method, and a die coater method.

The solvent (dispersion medium) is typically removed by a drying method. The solvent (dispersion medium) contained in the coating solution may be replaced with another solvent before a drying operation.

The insulating porous layer is disposed on one surface or both surfaces of a polyolefin porous film as described above to provide a nonaqueous electrolyte secondary battery laminated separator.

Embodiment 2: Nonaqueous Electrolyte Secondary Battery Member; Embodiment 3: Nonaqueous Electrolyte Secondary Battery A nonaqueous electrolyte secondary battery member in accordance with Embodiment 2 of the present invention is obtained by including a positive electrode, a nonaqueous electrolyte secondary battery separator in accordance with Embodiment 1 of the present invention, and a negative electrode, the positive electrode, the nonaqueous electrolyte secondary battery separator, and the negative electrode being disposed in this order.

A nonaqueous electrolyte secondary battery in accordance with Embodiment 3 of the present invention includes the nonaqueous electrolyte secondary battery separator in accordance with Embodiment 1 of the present invention.

A nonaqueous electrolyte secondary battery in accordance with Embodiment 3 of the present invention can be, for example, a nonaqueous secondary battery that achieves an electromotive force through doping with and dedoping of lithium, and can include a nonaqueous electrolyte secondary battery member including a positive electrode, a nonaqueous electrolyte secondary battery separator in accordance with Embodiment 1 of the present invention, and a negative electrode, the positive electrode, the nonaqueous electrolyte secondary battery separator, and the negative electrode being disposed in this order. Note that constituent elements, other than the nonaqueous electrolyte secondary battery separator, of the nonaqueous electrolyte secondary battery are not limited to those described below.

The nonaqueous electrolyte secondary battery in accordance with Embodiment 3 of the present invention is typically arranged so that a battery element is enclosed in an exterior member, the battery element including (i) a structure in which the negative electrode and the positive electrode face each other via the nonaqueous electrolyte secondary battery separator in accordance with Embodiment 1 of the present invention and (ii) an electrolyte with which the structure is impregnated. The nonaqueous electrolyte secondary battery is preferably a secondary battery including a nonaqueous electrolyte, and is particularly preferably a lithium-ion secondary battery. Note that the doping means occlusion, support, adsorption, or insertion, and means a phenomenon in which lithium ions enter an active material of an electrode (e.g., a positive electrode).

A nonaqueous electrolyte secondary battery member in accordance with Embodiment 2 of the present invention includes the nonaqueous electrolyte secondary battery separator in accordance with Embodiment 1 of the present invention. The nonaqueous electrolyte secondary battery separator has an MD/TD gloss ratio controlled so that the MD/TD gloss ratio is not less than 1.00, and thus has a TD/MD crease recovery angle ratio of close to 1. The nonaqueous electrolyte secondary battery separator, in other words, has a reduced anisotropy in terms of the degree of recovery from, for example, a crease, and can thus be handled easily. The nonaqueous electrolyte secondary battery member in accordance with Embodiment of the present invention can thus advantageously be produced easily. The nonaqueous electrolyte secondary battery in accordance with Embodiment 3 of the present invention, which includes the nonaqueous electrolyte secondary battery separator in accordance with Embodiment 1 of the present invention, can also advantageously be produced easily.

<Positive Electrode>

A positive electrode included in the nonaqueous electrolyte secondary battery member in accordance with Embodiment 2 of the present invention or in the nonaqueous electrolyte secondary battery in accordance with Embodiment 3 of the present invention is not limited to any particular one, provided that the positive electrode is one that is generally used as a positive electrode of a nonaqueous electrolyte secondary battery. Examples of the positive electrode encompass a positive electrode sheet having a structure in which an active material layer containing a positive electrode active material and a binder resin is formed on a current collector. The active material layer may further contain an electrically conductive agent.

The positive electrode active material is, for example, a material capable of being doped with and dedoped of lithium ions. Specific examples of such a material encompass a lithium complex oxide containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. It is possible to use only one kind of the above electrically conductive agents or two or more kinds of the above electrically conductive agents in combination.

Examples of the binding agent encompass (i) fluorine-based resins such as polyvinylidene fluoride, (ii) acrylic resin, and (iii) styrene butadiene rubber. Note that the binding agent serves also as a thickener. It is possible to use only one kind of the above binding agents or two or more kinds of the above binding agents in combination.

Examples of the positive electrode current collector encompass electric conductors such as Al, Ni, and stainless steel. Among these, Al is preferable because Al is easily processed into a thin film and is inexpensive.

Examples of a method for producing the positive electrode sheet encompass: a method in which a positive electrode active material, an electrically conductive agent, and a binding agent are pressure-molded on a positive electrode current collector; and a method in which (i) a positive electrode active agent, an electrically conductive agent, and a binding agent are formed into a paste with the use of a suitable organic solvent, (ii) then, a positive electrode current collector is coated with the paste, and (iii) subsequently, the paste is dried and then pressured so that the paste is firmly fixed to the positive electrode current collector.

<Negative Electrode>

A negative electrode included in the nonaqueous electrolyte secondary battery member in accordance with Embodiment 2 of the present invention or in the nonaqueous electrolyte secondary battery in accordance with Embodiment 3 of the present invention is not limited to any particular one, provided that the negative electrode is one that is generally used as a negative electrode of a nonaqueous electrolyte secondary battery. Examples of the negative electrode encompass a negative electrode sheet having a structure in which an active material layer containing a negative electrode active material and a binder resin is formed on a current collector. The active material layer may further contain an electrically conductive agent.

Examples of the negative electrode active material encompass (i) a material capable of being doped with and dedoped of lithium ions, (ii) lithium metal, and (iii) lithium alloy. Examples of the material encompass carbonaceous materials. Examples of the carbonaceous materials encompass natural graphite, artificial graphite, cokes, carbon black, and pyrolytic carbons. The electrically conductive agent can be any of the electrically conductive agents, described in the <Positive electrode> section, which can be contained in the positive electrode active material layer.

Examples of the negative electrode current collector encompass Cu, Ni, and stainless steel. Among these, Cu is more preferable because Cu is not easily alloyed with lithium especially in the case of a lithium ion secondary battery and is easily processed into a thin film.

Examples of a method for producing the negative electrode sheet encompass: a method in which a negative electrode active material is pressure-molded on a negative electrode current collector; and a method in which (i) a negative electrode active material is formed into a paste with the use of a suitable organic solvent, (ii) then, a negative electrode current collector is coated with the paste, and (iii) subsequently, the paste is dried and then pressured so that the paste is firmly fixed to the negative electrode current collector. The above paste preferably includes the above electrically conductive agent and the binding agent.

<Nonaqueous Electrolyte>

A nonaqueous electrolyte in a nonaqueous electrolyte secondary battery in accordance with Embodiment 3 of the present invention is not limited to any particular one, provided that the nonaqueous electrolyte is one that is generally used for a nonaqueous electrolyte secondary battery. The nonaqueous electrolyte can be one prepared by, for example, dissolving a lithium salt in an organic solvent. Examples of the lithium salt encompass $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one kind of the above lithium salts or two or more kinds of the above lithium salts in combination.

Examples of the organic solvent to be contained in the nonaqueous electrolyte encompass carbonates, ethers, esters, nitriles, amides, carbamates, sulfur-containing compounds, and fluorine-containing organic solvents obtained by introducing a fluorine group into any of the above organic solvents. It is possible to use only one kind of the above organic solvents or two or more kinds of the above organic solvents in combination.

<Method of Producing Nonaqueous Electrolyte Secondary Battery Member and Method of Producing Nonaqueous Electrolyte Secondary Battery>

Examples of a method of producing a nonaqueous electrolyte secondary battery member in accordance with Embodiment 2 of the present invention encompass a method in which the positive electrode, the nonaqueous electrolyte secondary battery separator in accordance with Embodiment 1 of the present invention, and the negative electrode are disposed in this order.

Further, examples of a method of producing a nonaqueous electrolyte secondary battery in accordance with Embodiment 3 of the present invention encompass a method of producing a nonaqueous electrolyte secondary battery in accordance with Embodiment 3 of the present invention by (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container while reducing the pressure inside the container.

EXAMPLES

The following description will discuss embodiments of the present invention in greater detail with reference to Examples and Comparative Examples. Note, however, that the present invention is not limited to the following Examples.

[Measurement Method]

Measurements were made by the method described below of physical properties and/or the like of nonaqueous electrolyte secondary battery separators produced in Examples 1 to 8 and comparative nonaqueous electrolyte secondary battery separators produced in Comparative Examples 1 to 5.

<Gloss>

The gloss was measured in conformity with JIS Z8741 with an incident angle of 60 degrees and a light-receiving angle of 60 degrees.

An A4-size piece was cut out of each of the polyolefin porous films described for Examples 1 to 8 and Comparative Examples 1 to 5. The gloss of the A4-size polyolefin porous film was measured with use of a handy type glossmeter (PG-IIM, available from Nippon Denshoku Industries Co., Ltd., with a measurement area of 10.0 mm×20.0 mm) while the A4-size polyolefin porous film was on a sheet of KB paper (KB-39N, available from KOKUYO Co., Ltd.).

The measurement was made seven times at a portion for each direction, with (i) an MD gloss being a gloss value for a case where the direction of incidence and light receiving is identical to the MD of the polyolefin porous film and (ii) a TD gloss being a gloss value for a case where the direction of incidence and light receiving is identical to the TD of the polyolefin porous film. After the seven measurements for each direction, the average of, among the seven measurement values, five measurement values other than the largest and smallest measurement values was calculated as the gloss for the direction (that is, the MD gloss or TD gloss). The MD gloss was then divided by the TD gloss. The quotient was rounded to the nearest hundredth to give an MD/TD gloss ratio. The surface on which the gloss was measured was identical to the surface on which a crease recovery angle (described later) was measured (that is, the surface on the valley side as the polyolefin porous film was folded).

Subsequently, the standard deviation of the MD gloss and the standard deviation of the TD gloss were calculated from the above five measurement values for each direction. The standard deviations thus calculated were each rounded to the nearest tenth to give an MD standard deviation and a TD standard deviation.

<Crease Recovery Angle>

The crease recovery angle of each of the polyolefin porous films described for Examples 3 to 8 and Comparative Examples 4 and 5 was measured at 23° C. and 50% RH by the 4.9 N load method, which is defined in JIS L 1059-1 (2009).

Specifically, a 15 mm×40 mm test piece was cut out of each of the polyolefin porous films described for Examples 3 to 8 and Comparative Examples 4 and 5. The test piece was inserted into a metal plate holder accompanying a Monsant recovery tester (MR-1, available from Daiei Kagaku Seiki MFG Co., Ltd.). That portion of the test piece which was inserted in the metal plate holder had a length of 18 mm.

Next, that portion of the test piece which was not inserted in the metal plate holder was folded down. The metal plate holder included two metal plates having respective lengths different from each other. The test piece was folded along an end of the shorter metal plate such that the upper surface of the test piece would form a valley.

Further, the metal plate holder was placed inside a plastic press holder having a long side of 95 mm and a short side of 20 mm. In placing the metal plate holder inside the plastic press holder, the folded portion of the test piece was overlapped with the plastic press holder. Subsequently, a 500 g weight having a diameter of 40 mm was placed on an end of the plastic press holder at which end the test piece was present. Five minutes later, the weight was removed, and then the metal plate holder was taken out of the plastic press holder.

Thereafter, the metal plate holder with the test piece placed inside was turned upside down and was then inserted into a metal plate holder support of the Monsant recovery tester. The metal plate holder was inserted into the Monsant recovery tester in such a manner that that portion of the test piece which was not inserted in the metal plate holder was positioned in the vertical downward vertical direction. A rotary plate of the Monsant recovery tester was rotated in such a manner that the suspended portion of the test piece constantly coincided with a perpendicular line at the center of the Monsant recovery tester. Five minutes later, a numerical value (angle) marked on a protractor of the Monsant recovery tester was read as the crease recovery angle. The above measurement of the crease recovery angle was made three times under each condition. The average of the three measurement values was calculated as the crease recovery angle.

The above measurement of the crease recovery angle was made with respect to a test piece having a length of 40 mm which length corresponded to the TD of the polyolefin porous film. The crease recovery angle thus calculated was used as a TD crease recovery angle. The above measurement of the crease recovery angle was made with respect to a test piece having a length of 40 mm which length corresponded to the MD of the polyolefin porous film. The crease recovery angle thus calculated was used as an MD crease recovery angle.

The TD crease recovery angle was then divided by the MD crease recovery angle. The quotient was rounded to the nearest hundredth to give a TD/MD crease recovery angle ratio.

Comparative Example 1

First, 68% by weight of ultra-high molecular weight polyethylene powder (GUR2024, available from Ticona Corporation) and 32% by weight of polyethylene wax (FNP-0115, available from Nippon Seiro Co., Ltd.) that had a weight-average molecular weight of 1000 were prepared, i.e., 100 parts by weight in total of the ultra-high molecular weight polyethylene and the polyethylene wax were prepared. Then, 0.4 parts by weight of a phenolic antioxidant 1, 0.1 parts by weight of a phosphorus-based antioxidant 2, and 1.3 parts by weight of sodium stearate were added to the ultra-high molecular weight polyethylene and the polyethylene wax, and then calcium carbonate (available from Maruo Calcium Co., Ltd.) having an average particle size of 0.1 μm was further added in an amount of 38% by volume with respect to the total volume of these compounds. Then, these compounds were mixed in a state of powder in a Henschel mixer, and were then melted and kneaded in a twin screw kneading extruder, and thus a polyolefin resin composition was obtained.

Then, the polyolefin resin composition was rolled with use of a pair of rollers each having a surface temperature of 150° C. so that a sheet was produced. This sheet was immersed in an aqueous hydrochloric acid solution (containing 4 mol/L of hydrochloric acid and 0.5% by weight of a nonionic surfactant) for removal of the calcium carbonate. Subsequently, the sheet, from which calcium carbonate had been removed, was stretched 6.2-fold at 105° C. with use of a tenter uniaxial stretching machine available from Ichikin Co., Ltd. while the temperature of the heat fixation region was set at 126° C. This produced a polyolefin porous film 1. The polyolefin porous film 1 was used as a comparative nonaqueous electrolyte secondary battery separator 1. The polyolefin porous film 1 produced had a thickness of not more than 20 μm as measured with use of a high-precision digital measuring device (VL-50) available from Mitutoyo Corporation.

Comparative Example 2

A surface of the comparative nonaqueous electrolyte secondary battery separator 1 was rubbed in the TD with use of sandpaper (C947H, waterproof abrasive paper available from Noritake Coated Abrasive Co., Ltd., with a grain size of 1200) (physical treatment). This produced a comparative nonaqueous electrolyte secondary battery separator 2. The comparative nonaqueous electrolyte secondary battery separator 2 had an MD/TD gloss ratio of 0.70.

Comparative Example 3

A surface of the comparative nonaqueous electrolyte secondary battery separator 1 was rubbed in the TD with use of paper wipe (Kimtowel, available from Nippon Paper Crecia Co., Ltd.) (physical treatment). This produced a comparative nonaqueous electrolyte secondary battery separator 3. The comparative nonaqueous electrolyte secondary battery separator 3 had an MD/TD gloss ratio of 0.67.

Example 1

A surface of the comparative nonaqueous electrolyte secondary battery separator 1 was rubbed in the MD with use of sandpaper (C947H, waterproof abrasive paper available from Noritake Coated Abrasive Co., Ltd., with a grain size of 1200) (physical treatment). This produced a nonaqueous electrolyte secondary battery separator 1. The nonaqueous electrolyte secondary battery separator 1 had an MD/TD gloss ratio of 1.77.

Example 2

A surface of the comparative nonaqueous electrolyte secondary battery separator 1 was rubbed in the MD with use of paper wipe (Kimtowel, available from Nippon Paper Crecia Co., Ltd.) (physical treatment). This produced a nonaqueous electrolyte secondary battery separator 2. The nonaqueous electrolyte secondary battery separator 2 had an MD/TD gloss ratio of 2.17.

[Controlling MD/TD Gloss Ratio]

Table 1 below shows the respective MD/TD gloss ratios for Examples 1 and 2 and Comparative Examples 1 to 3.

TABLE 1

|  | MD gloss | TD gloss | MD/TD gloss ratio |
| --- | --- | --- | --- |
| Comparative Example 1 | 31 | 35 | 0.89 |
| Comparative Example 2 | 16 | 23 | 0.70 |
| Comparative Example 3 | 41 | 61 | 0.67 |
| Example 1 | 23 | 13 | 1.77 |
| Example 2 | 63 | 29 | 2.17 |

The results of Comparative Example 1 and Example 1 in Table 1 show that rubbing a nonaqueous electrolyte secondary battery separator in the MD with use of sandpaper (physical treatment) can decrease the TD gloss in particular and thereby allows the MD/TD gloss ratio to be not less than 1.00.

The results of Comparative Example 1 and Example 2 show that rubbing a nonaqueous electrolyte secondary battery separator in the MD with use of paper wipe (physical treatment) can increase the MD gloss in particular and thereby allows the MD/TD gloss ratio to be not less than 1.00.

The results of Comparative Examples 1 and 2 show that rubbing a nonaqueous electrolyte secondary battery separator in the TD with use of sandpaper (physical treatment) decreases the MD gloss in particular, with the result of the MD/TD gloss ratio being smaller in Comparative Example 2.

The results of Comparative Examples 1 and 3 show that rubbing a nonaqueous electrolyte secondary battery separator in the TD with use of paper wipe (physical treatment) increases the TD gloss in particular, with the result of the MD/TD gloss ratio being smaller in Comparative Example 3.

Examples 3 to 8 and Comparative Examples 4 and 5

Polyolefin porous films having respective MD/TD gloss ratios in Table 2 for Examples 3 to 8 and Comparative Examples 4 and 5 were used as nonaqueous electrolyte secondary battery separators 3 to 8 and comparative nonaqueous electrolyte secondary battery separators 4 and 5. The TD/MD crease recovery angle ratio of each of the nonaqueous electrolyte secondary battery separators 3 to 8 and comparative nonaqueous electrolyte secondary battery separators 4 and 5 was calculated from the MD crease recovery angle and TD crease recovery angle calculated by the method described above. Table 3 shows the results.

The standard deviation of the MD gloss and the standard deviation of the TD gloss of each of the nonaqueous electrolyte secondary battery separators 3 to 8 and comparative nonaqueous electrolyte secondary battery separators 4 and 5 were calculated by the method described above. Table 2 shows the results.

Further measurements were made of the MD/TD gloss ratio and the standard deviation of the gloss for each direction on a surface of each of the nonaqueous electrolyte secondary battery separators 3 to 8 which surface (back side) was opposite to the surface on which the MD/TD gloss ratios shown in Table 2 were measured. The results show that the MD/TD gloss ratio on the back-side surface of each of the nonaqueous electrolyte secondary battery separators 3 to 8 was not less than 1.00 and that the standard deviation of the gloss for each direction of each of the nonaqueous electrolyte secondary battery separators 3 to 8 was not more than 8.0. The above polyolefin porous films each had a thickness of not more than 20 μm as measured with use of a high-precision digital measuring device (VL-50) available from Mitutoyo Corporation.

TABLE 2

|  | Standard deviation of MD gloss | Standard deviation of TD gloss | MD/TD gloss ratio |
| --- | --- | --- | --- |
| Example 3 | 2.7 | 0.9 | 1.72 |
| Example 4 | 2.2 | 1.4 | 1.32 |
| Example 5 | 1.7 | 2.6 | 1.22 |
| Example 6 | 2.3 | 1.3 | 1.12 |
| Example 7 | 2.5 | 1.6 | 1.02 |
| Example 8 | 3.0 | 2.0 | 1.00 |
| Comparative Example 4 | 3.1 | 2.4 | 0.89 |
| Comparative Example 5 | 2.1 | 4.9 | 0.86 |

TABLE 3

|  | TD/MD crease recovery angle ratio |
| --- | --- |
| Example 3 | 0.64 |
| Example 4 | 0.59 |

TABLE 3-continued

| | TD/MD crease recovery angle ratio |
|---|---|
| Example 5 | 0.72 |
| Example 6 | 1.12 |
| Example 7 | 1.15 |
| Example 8 | 1.08 |
| Comparative Example 4 | 2.30 |
| Comparative Example 5 | 3.16 |

CONCLUSION

Tables 2 and 3 show that each of the nonaqueous electrolyte secondary battery separators 3 to 8, which had an MD/TD gloss ratio of not less than 1.00, had a TD/MD crease recovery angle ratio of not less than 0.5 and not more than 1.5, that is, close to 1. This TD/MD crease recovery angle ratio, in other words, shows a small anisotropy in terms of the degree of recovery from, for example, a crease, and is within a preferable range in terms of how easily the nonaqueous electrolyte secondary battery separator can be handled.

On the other hand, the comparative nonaqueous electrolyte secondary battery separators 4 and 5, each of which had an MD/TD gloss ratio of less than 1.00, had respective TD/MD crease recovery angle ratios of 2.30 and 3.16. These are excessively larger than the above preferable range.

The above results prove that a nonaqueous electrolyte secondary battery separator including a polyolefin porous film having an MD/TD gloss ratio of not less than 1.00 has a TD/MD crease recovery angle ratio of close to 1 unlike conventional nonaqueous electrolyte secondary battery separators including a polyolefin porous film having an MD/TD gloss ratio of less than 1.00. The above results therefore show that a nonaqueous electrolyte secondary battery separator in accordance with an embodiment of the present invention is a homogeneous nonaqueous electrolyte secondary battery separator that has a reduced anisotropy in terms of the degree of recovery from, for example, a crease and that can be handled easily.

INDUSTRIAL APPLICABILITY

A nonaqueous electrolyte secondary battery separator in accordance with an embodiment of the present invention has a TD/MD crease recovery angle ratio of close to 1. The nonaqueous electrolyte secondary battery separator in accordance with an embodiment of the present invention is thus suitably usable in various industries involving nonaqueous electrolyte secondary batteries.

The invention claimed is:

1. A nonaqueous electrolyte secondary battery separator comprising:
    a polyolefin porous film,
    the polyolefin porous film having a ratio of a 60-degree gloss in a machine direction to a 60-degree gloss in a transverse direction of not less than 1.00.

2. The nonaqueous electrolyte secondary battery separator according to claim 1, further comprising:
    an insulating porous layer.

3. The nonaqueous electrolyte secondary battery separator according to claim 2, wherein the insulating porous layer contains at least one resin selected from the group consisting of a polyolefin, a (meth)acrylate-based resin, a fluorine-containing resin, a polyamide-based resin, a polyester-based resin, and a water-soluble polymer.

4. The nonaqueous electrolyte secondary battery separator according to claim 3, wherein
    the polyamide-based resin is aramid resin.

5. A nonaqueous electrolyte secondary battery member comprising:
    a positive electrode;
    a nonaqueous electrolyte secondary battery separator according to claim 1; and
    a negative electrode,
        wherein the positive electrode is adjacent to the nonaqueous electrolyte secondary battery separator and the negative electrode is adjacent to the nonaqueous electrolyte secondary battery separator on a side opposite the positive electrode.

6. A nonaqueous electrolyte secondary battery comprising:
    a nonaqueous electrolyte secondary battery separator according to claim 1.

7. A nonaqueous electrolyte secondary battery member comprising:
    a positive electrode;
    a nonaqueous electrolyte secondary battery separator according to claim 2; and
    a negative electrode,
        wherein the positive electrode is adjacent to the nonaqueous electrolyte secondary battery separator and the negative electrode is adjacent to the nonaqueous electrolyte secondary battery separator on a side opposite the positive electrode.

8. A nonaqueous electrolyte secondary battery comprising:
    a nonaqueous electrolyte secondary battery separator according to claim 2.

* * * * *